United States Patent
Winter (10) Patent No.: US 8,068,434 B2
(45) Date of Patent: Nov. 29, 2011

(54) NETWORK INFRASTRUCTURE CAPABILITY DETECTION

(75) Inventor: Robert Lee Winter, Leander, TX (US)

(73) Assignee: Dell Products L.P., Round Rock, TX (US)

(*) Notice: Subject to any disclaimer, the term of this patent is extended or adjusted under 35 U.S.C. 154(b) by 90 days.

(21) Appl. No.: 12/180,023

(22) Filed: Jul. 25, 2008

(65) Prior Publication Data
US 2010/0020703 A1   Jan. 28, 2010

(51) Int. Cl.
H04L 1/00 (2006.01)
H04L 12/26 (2006.01)
H04L 12/28 (2006.01)
H04L 12/56 (2006.01)

(52) U.S. Cl. ............ 370/248; 370/389; 370/392

(58) Field of Classification Search ............... 370/241, 370/247, 248, 249, 252, 389, 392
See application file for complete search history.

(56) References Cited

U.S. PATENT DOCUMENTS

| 7,505,484 B2* | 3/2009 | Pancholi et al. | 370/470 |
|---|---|---|---|
| 7,650,376 B1* | 1/2010 | Blumenau | 709/203 |
| 2003/0147645 A1* | 8/2003 | Imajuku et al. | 398/7 |
| 2003/0185208 A1* | 10/2003 | Lee et al. | 370/389 |
| 2004/0095893 A1* | 5/2004 | Goringe et al. | 370/252 |
| 2005/0018647 A1* | 1/2005 | Lebrun et al. | 370/351 |
| 2005/0135261 A1* | 6/2005 | Lee et al. | 370/241 |
| 2006/0159025 A1* | 7/2006 | Abdo et al. | 370/249 |
| 2007/0195774 A1* | 8/2007 | Sherman et al. | 370/392 |
| 2007/0248019 A1* | 10/2007 | Feng et al. | 370/241 |
| 2009/0022161 A1* | 1/2009 | Hirano | 370/400 |
| 2011/0078237 A1* | 3/2011 | Nakamura | 709/203 |

OTHER PUBLICATIONS

A. Conta et al., RFC 4443—Internet Control Message Protocol (ICMPv6) for the IPv6, Mar. 2006, p. 3.*

* cited by examiner

Primary Examiner — Chi Pham
Assistant Examiner — Farah Faroul
(74) Attorney, Agent, or Firm — Haynes and Boone, LLP (57) ABSTRACT

A system to discover a network infrastructure capability includes one or more subsystems to establish a communication path between a first endpoint and a second endpoint. A test packet is sent from a first endpoint along the communication path and a value is associated with the test packet which relates to capabilities of the communication path. The test packet value is returned to the first endpoint.

20 Claims, 6 Drawing Sheets

NETWORK INFRASTRUCTURE CAPABILITY DETECTION

BACKGROUND

The present disclosure relates generally to information handling systems, and more particularly to a network infrastructure capability detection.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Figure 1:
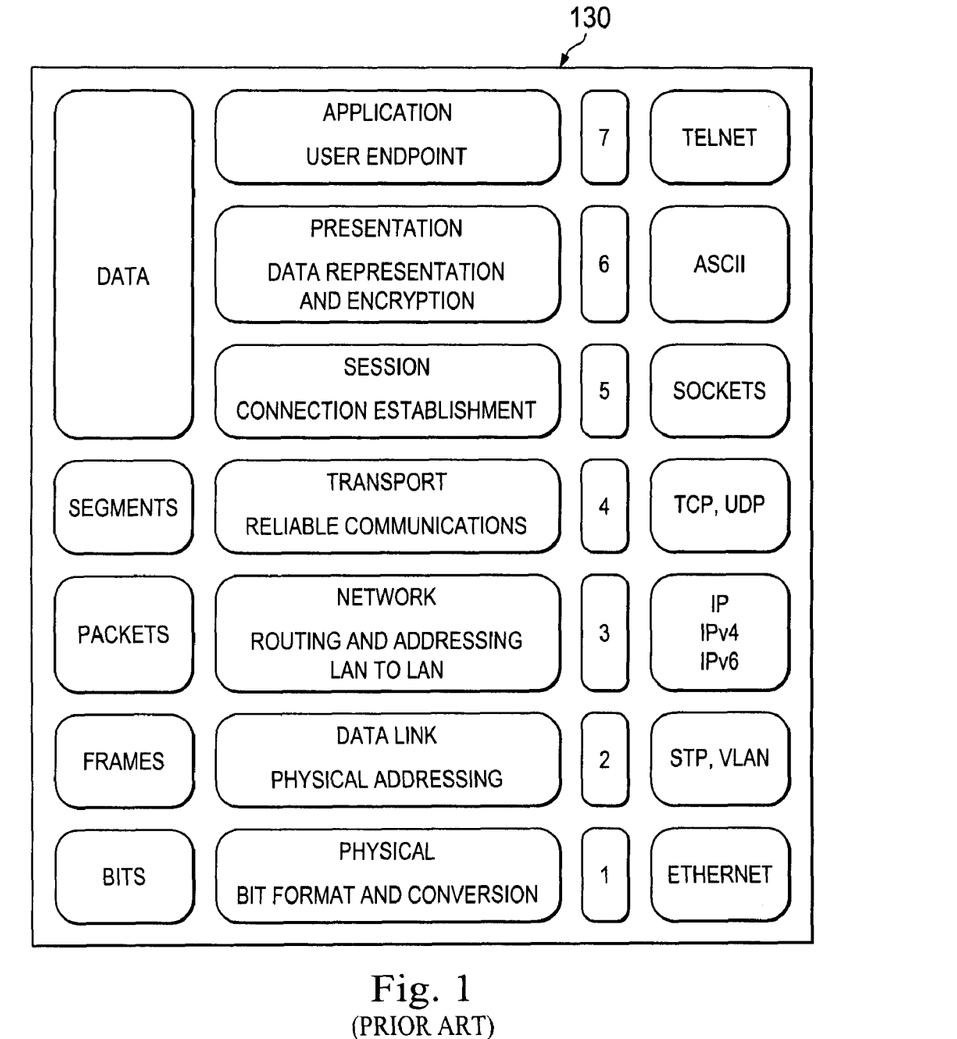
FIG. 1 illustrates an embodiment of an open system interconnect (OSI) reference model.

IHSs may be configured to communicate using one or more communication networks. FIG. 1 illustrates an embodiment of a traditional open system interconnect (OSI) reference model 130. As should be readily understood by a person having ordinary skill in the art, common responsibilities assigned to communication protocols in the OSI model relegates guaranteed delivery of messages to OSI Layer 4 or the "Transport" Layer. OSI layer 4, the "Transport" layer is where, communication protocols such as the transport control protocol (TCP) and the user datagram protocol (UDP) reside. The OSI model was proposed at a time when the lower infrastructure layers, such as Ethernet at Layer 2, was a "best-effort" delivery system. Thus, a mechanism was required to re-transmit the missed Layer 2 packets and this mechanism was embodied at Layer 4 in the TCP protocol for Internet Protocol (IP) implementations.

More recently, more robust Ethernet infrastructure technology systems have been implemented than these previous systems. Credit based flow-control and rate-limiting, having a more assured delivery, implies that transport protocol decisions may be made based in part on the quality of the underlying network infrastructure. From this, certain efficiencies may be obtained for communications. However, guaranteed-delivery Ethernet technologies may negate the use of TCP in applications that are contained within a Local Area Network (LAN). Therefore, a system may be required to determine the quality of the underlying physical and link layers in order to make these transport layer decisions. Once a determination of the quality of the underlying physical and link layers is successful, communication systems may transport iSCSI over UDP instead of TCP or to deliver RDMA requests via Ethernet instead of TCP. Other protocols may also be available. Because UDP is a much lighter-weight transport, increased throughput and decreased CPU utilization is therefore possible. Using Ethernet tunneled protocols alone may then, in large part, reduce or eliminate the higher layer protocols over these better quality Ethernet networks.

Accordingly, it would be desirable to provide an improved network infrastructure capability detection absent the disadvantages discussed above.

SUMMARY

According to one embodiment, a system to discover a network infrastructure capability includes one or more subsystems to establish a communication path between a first endpoint and a second endpoint. A test packet is sent from a first endpoint along the communication path and a value is associated with the test packet which relates to capabilities of the communication path. The test packet value is returned to the first endpoint.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 2:
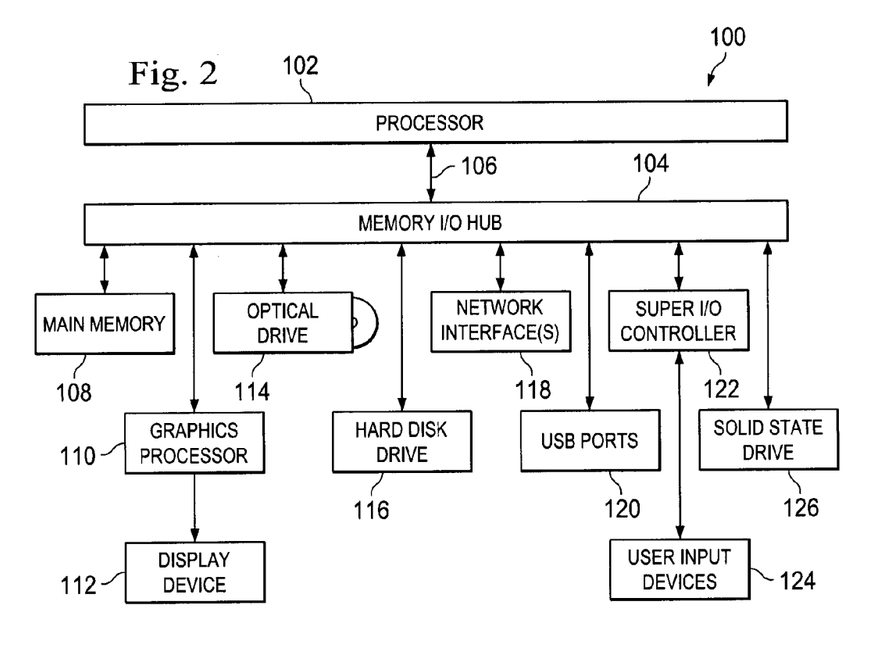
FIG. 2 illustrates an embodiment of an information handling system (IHS).

FIG. 2 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 2, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The present disclosure provides a system and method to determine physical and link-layer network infrastructure capabilities on a per-connection basis to enable better upper layer protocol choice and offload decisions. A network pathway binds two Internet protocol (IP) addressable endpoints in order to create a connection across the network. The network may span a local area network (LAN), several LANs and/or IP domains. In an embodiment, a packet exchange occurs between these two IP endpoints and information regarding the traversed infrastructure pathway is returned to the initiating IP endpoint to determine the capabilities of the underlying physical and link-layer infrastructure. In an embodiment, a communication packet is sent from a first endpoint to a second endpoint, wherein the communication packet uses a transport protocol associated with the value of the packet.

Figure 3:
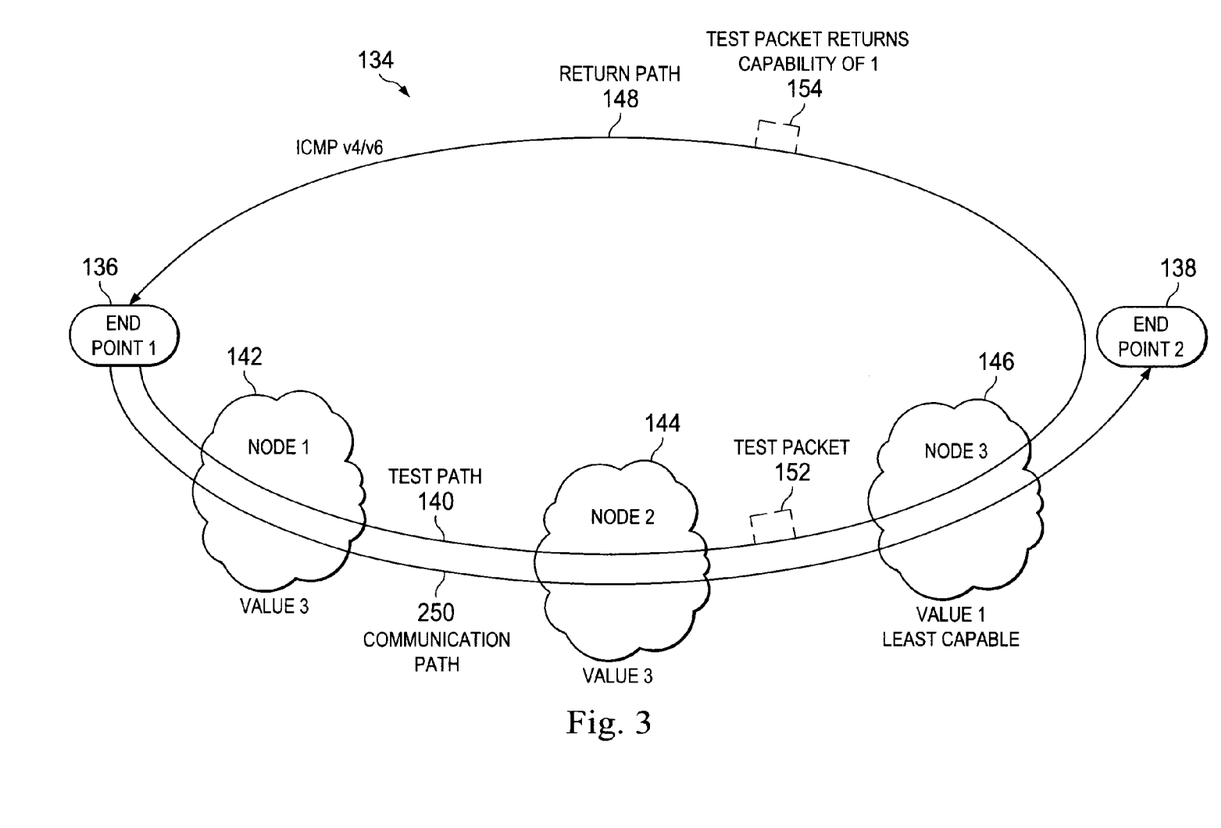
FIG. 3 illustrates a block diagram of an embodiment of an system for discovery of underlying network infrastructure capabilities along an internet protocol (IP) pathway.

FIG. 3 illustrates a block diagram of an embodiment of a system 134 for discovery of underlying network infrastructure capabilities along an internet protocol (IP) pathway. The system 134 includes a first endpoint 136 and a second endpoint 138. In this embodiment, information is to be sent from the first endpoint 136 to the second endpoint 138. Therefore, a test path 140 is established between a first node 142, a second node 144 and a third node 146. The system 134 queries each node 142, 144 and 146 to determine the capabilities of the node 142, 144 and/or 146 and forwards the answer as a value of the node with the lowest capability node 142, 144 and/or 146 to the next node or to the first end point 136 via a return path 148. There may be any number of nodes in the system 134. The system 134 may then adjust the properties of the information to make the best use of a communication path 250. For example, the system 134 may use the information received from the test path 140 to send a larger information packet than on the communication path 250 with less capability for transferring large files.

Figure 4:
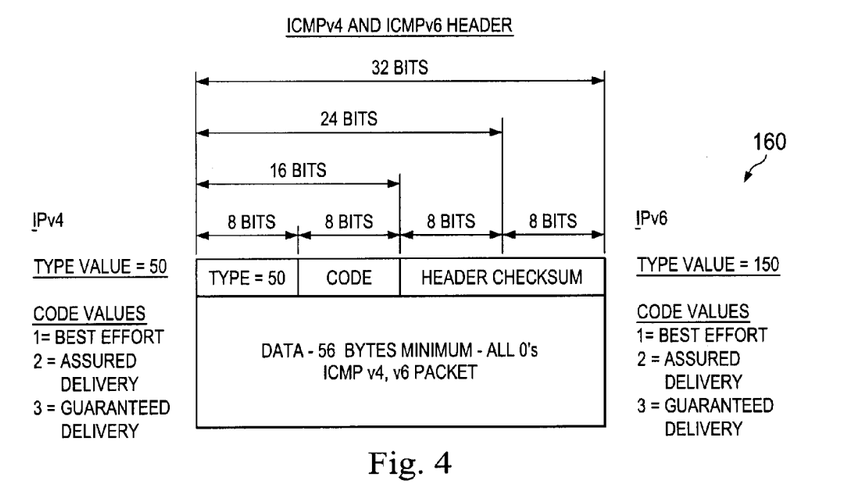
FIG. 4 illustrates an embodiment of an ICMP header.
Figure 5:
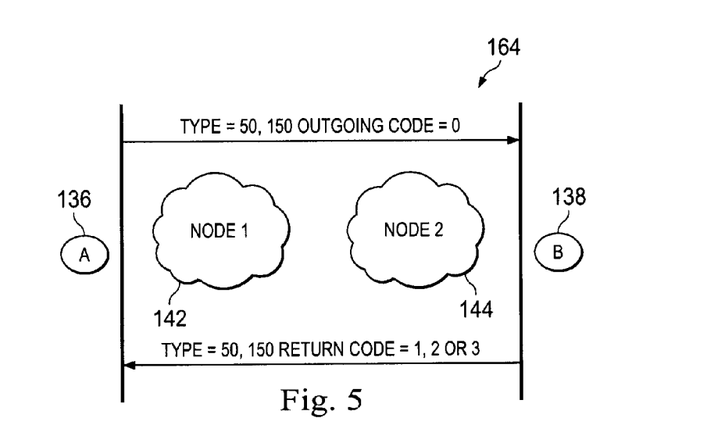
FIG. 5 illustrates a block diagram of an embodiment of an infrastructure quality discovery message.
Figure 6:
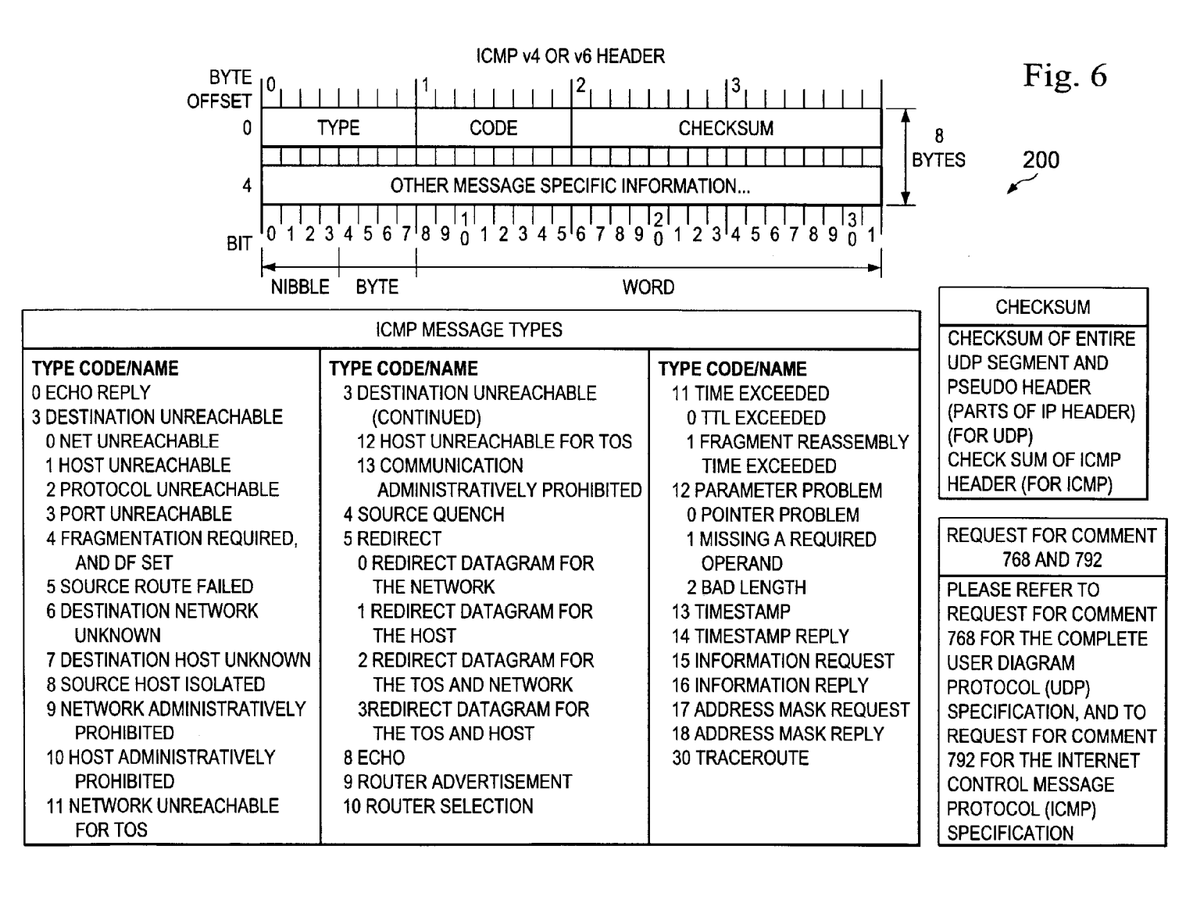
FIG. 6 illustrates an embodiment of an ICMP Header.

FIG. 4 illustrates an embodiment of an ICMP header 160 and FIG. 5 illustrates a block diagram of an embodiment of an infrastructure quality discovery message 164. FIG. 6 illustrates an embodiment of an ICMP Header 166. The Internet Control Message Protocol (ICMP) Data Unit (PDU) that has been specified by the Internet Engineering Task Force (IETF) in STD0005 for IP version 4 (ICMPv4) and Request for Comments (RFC) 4443 for IP version 6 (ICMPv6) provides a method for discovery of infrastructure parameters. Referring to FIGS. 4, 5 and 6, which show the packet format from ICMPv4 and ICMPv6 messages, the code values and the protocol timing diagram. It is noted that a difference between the two types of ICMP is the coding of the type messages (e.g., IPv6 specifies 127 and less for error messages and 128 and above for informational messages). Therefore, a type 50 message for ICMPv4 and a type 150 message for ICMPv6, which are both unassigned at this time, may be used to define an ICMP packet that collects infrastructure information along the path, such as the communication path 250. It should be readily understood that other values and other standards may be used with the system 134. In an embodiment, the code values may be 1 for best effort, 2 for assured delivery and 3 for guaranteed delivery. As shown in FIG. 5, a test packet signal may leave the first endpoint 136 having a value of zero, pass through the first node 142 and the second node 144 on its way to the second end point 138 and return to the first end point 136 having a value of 1, 2 or 3, whatever is the value of the node having the lowest capability.

In an embodiment, the system 134 sends a test packet from the first end point 136 along the test path 140. The test packet leaves the first end point 136 having a value of zero. As the test packet passes through the nodes 142 and 144, (a first test packet location 152) the value of the test packet is 3 because each of the nodes 142 and 144 have capability values of 3 (e.g., guaranteed delivery). Then, the test packet passes through the third node 146 that has a capability value of 1 (a lower capability, e.g., best effort). Therefore, at a second test packet location 154 on the return path 148, the test packet has a value of 1. Thus, the system 134 will send information to the second endpoint 138 along the communication path 250 using a best effort (e.g., value 1) communication. It should be readily understood that other values and other standards may be used within the scope and spirit of this disclosure.

Figure 7:
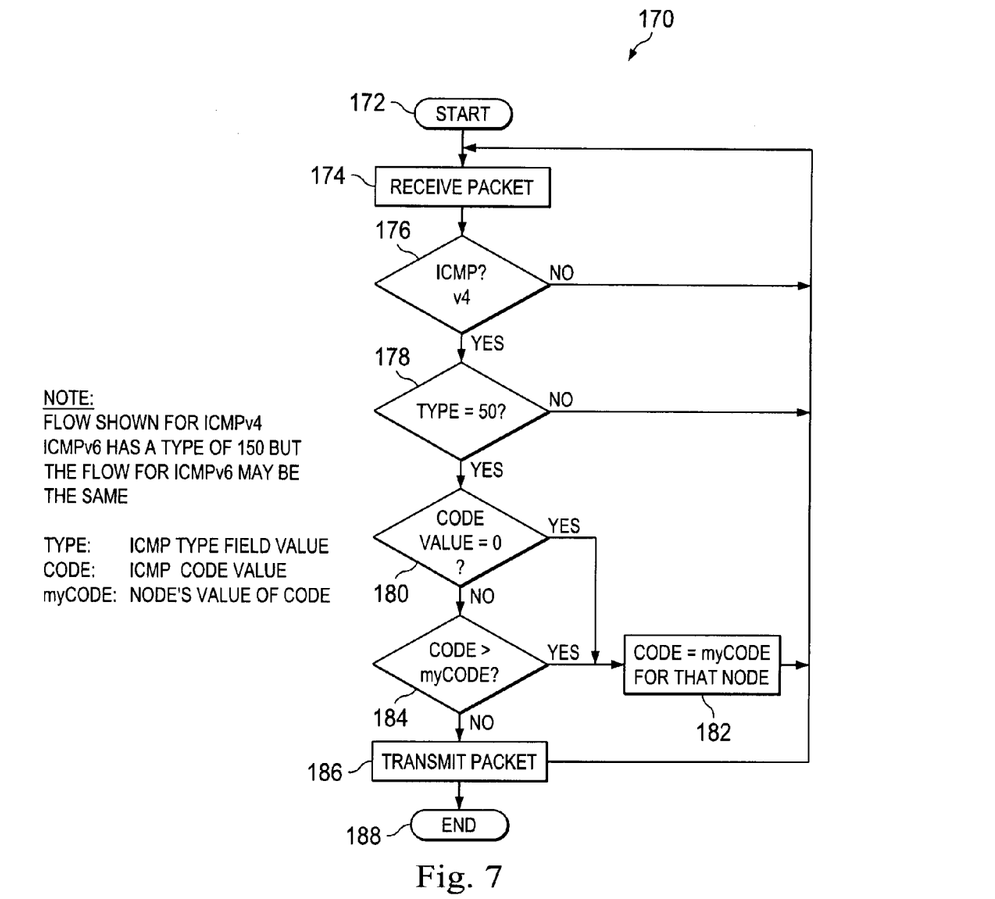
FIG. 7 illustrates a flow chart of an embodiment of processing logic of participating infrastructure discovery nodes.

FIG. 7 illustrates a flow chart of an embodiment of a processing logic method 170 of participating infrastructure discovery nodes (e.g., 142, 144 and/or 146). The flowchart in FIG. 6 outlines an embodiment of the logic which may provide how a type 50 ICMPv4 or type 150 ICMPv6 packet is processed and, possibly, modified by each node along the path. In an example, a type 50 packet exchange returns a code value of 2, or assured delivery, indicating that the IP pathway has at least a level of assured delivery along that path. IHSs 100 may then make better transport protocol choices or offload choices based on this information. Without this path quality determination inefficiencies may occur in the tuning of the two IP endpoints 136 and 138 that complete the connection. With this capability increased throughput between the two endpoints 136 and 138 may be possible. In an embodiment, each end of the IP endpoints 136 and 138 may supply an application that to build, send, receive and interpret an ICMPv4 type 50 or ICMPv6 type 150 message as governed by the logic flow of FIG. 7. The method 170 is shown for the first node 142 using ICMPv4, but any node or standard may follow the steps of method 170.

As shown in FIG. 7, the method 170 starts at 172 where a test packet is sent along the test path 140 by the first end point 136 towards the first node 142. The method 170 proceeds to block 174 where the first node 142 receives the test packet from the first end point 136. The method 170 then proceeds to decision block 176 where the method 170 determines whether the test packet is an ICMPv4 protocol. If no, the test packet is not ICMPv4 protocol, the method 170 returns to block 174 and the method 170 waits to receive another packet. If yes, the test packet is ICMPv4 protocol, the method 170 proceeds to decision block 178 where the method 170 determines whether the test packet is type 50. If no, the test packet is not type 50, the method 170 returns to block 174 and the method 170 waits to receive another packet. If yes, the test packet is type 50, the method 170 proceeds to decision block 180 where the method 170 determines whether the test packet code value is equal to zero. If yes, the test packet code value is equal to zero, the method 170 proceeds to block 182 where the method 170 changes the test packet code value to the value for that node (e.g., the first node, 142 having a value of 3 would make the test packet code value equal to 3). Then, the method 170 returns to block 174 and the method 170 waits to receive another packet. If no, the test packet code value is not equal to zero, the method 170 proceeds to decision block 184 where the method 170 determines whether the test packet code value is greater than the value for that node (e.g. the first node 142 value of 3). If yes, the test packet code value is greater than the value for that node, the method 170 proceeds to block 182 and the method 170 proceeds as described above with respect to block 182. If no, the test packet code value is not greater than the value for that node, the method 170 proceeds to block 186 where the method 170 transmits the packet to the next step on the test path 140 (e.g., the second node 144) or the nest step on the return path 148 (e.g., first end point 136) and returns to block 174 and the method 170 proceeds again as described above with reference to block 174. Thus, this sequence of the method 170 ends at block 188.

In an embodiment, the present disclosure may be used to determine other characteristics, such as path security. Instead of determining node capability, the system may determine node security. Thus, it should be readily understood by a person having ordinary skill in the art that the present disclosure may be used to determine path security substantially similar to determining path capability. It should also be readily understood that the present disclosure may be used before or during or after every communication between the first endpoint 136 and the second endpoint 138.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly.

What is claimed is:

1. A system to discover a network infrastructure capability, the system comprising one or more hardware subsystems to:
   establish a communication path between a first endpoint and a second endpoint, wherein the communication path includes a plurality of nodes each having a layered infrastructure;
   send a test packet from the first endpoint along the communication path;
   associate a delivery assurance value with the test packet that relates to the lowest delivery assurance of the plurality of nodes in the communication path wherein the delivery assurance value includes one of a best effort delivery assurance, an assured delivery assurance, and a guaranteed delivery assurance; and
   return the test packet value to the first endpoint.

2. The system of claim 1, wherein the test packet uses an Internet control message protocol (ICMP).

3. The system of claim 2, wherein the test packet is a type 50 message using ICMPv4.

4. The system of claim 2, wherein the test packet is a type 150 message using ICMPv6.

5. The system of claim 1, wherein the layer infrastructure of each node includes a physical-layer infrastructure and a link-layer infrastructure.

6. The system of claim 1, wherein the first endpoint and the second endpoint are Internet protocol (IP) addressable endpoints.

7. The system of claim 1, further comprising one or more subsystems to:
   send a communication packet from the first endpoint to the second endpoint, wherein the communication packet uses a transport protocol associated with the delivery assurance value of the test packet.

8. An information handling system (IHS) comprising:
   a processor;
   a network interface coupled with the processor; and
   a system to discover a network infrastructure capability using the network interface, the system to discover the network infrastructure capability comprising one or more subsystems to:
      establish a communication path between a first endpoint and a second endpoint, wherein the communication path includes a plurality of nodes each having a layered infrastructure;
      send a test packet from the first endpoint along the communication path;
      associate a delivery assurance value with the test packet that relates to the lowest delivery assurance of the plurality of nodes in the communication path, wherein the delivery assurance value includes one of a best effort delivery assurance, an assured delivery assurance, and a guaranteed delivery assurance; and
      return the test packet value to the first endpoint.

9. The IHS of claim 8, wherein the test packet uses an Internet control message protocol (ICMP).

10. The IHS of claim 9, wherein the test packet is a type 50 message using ICMPv4.

11. The IHS of claim 9, wherein the test packet is a type 150 message using ICMPv6.

12. The IHS of claim 8, wherein the layer infrastructure of each node includes a physical-layer infrastructure and a link-layer infrastructure.

13. The IHS of claim 8, wherein the first endpoint and the second endpoint are Internet protocol (IP) addressable endpoints.

14. The IHS of claim 8, further comprising one or more subsystems to:
   send a communication packet from the first endpoint to the second endpoint, wherein the communication packet uses a transport protocol associated with the delivery assurance value of the test packet.

15. A method to discover a network infrastructure capability comprising:
   establishing a communication path between a first endpoint and a second endpoint, wherein the communication path includes a plurality of nodes each having a layered infrastructure;
   sending a test packet from the first endpoint along the communication path;
   associating a delivery assurance value with the test packet that relate to the lowest delivery assurance of the plurality of nodes in the communication path, wherein the delivery assurance value includes one of a best effort delivery assurance, an assured delivery assurance, and a guaranteed delivery assurance; and
   returning the test packet value to the first endpoint.

16. The method of claim 15, wherein the test packet uses an Internet control message protocol (ICMP).

17. The method of claim 16, wherein the test packet is a type 50 message using ICMPv4.

18. The method of claim 16, wherein the test packet is a type 150 message using ICMPv6.

19. The method of claim 15, wherein the layer infrastructure includes a physical-layer infrastructure and a link-layer infrastructure.

20. The method of claim 15, further comprising:
sending a communication packet from the first endpoint to the second endpoint, wherein the communication packet uses a transport protocol associated with the delivery value of the test packet.

* * * * *